(12) United States Patent
Kaji et al.

(10) Patent No.: US 10,649,219 B2
(45) Date of Patent: *May 12, 2020

(54) VIRTUAL OR AUGMENTED REALITY HEADSETS HAVING ADJUSTABLE INTERPUPILLARY DISTANCE

(71) Applicant: Magic Leap, Inc., Dania Beach, FL (US)

(72) Inventors: Masamune Kaji, Brooklyn, NY (US); Michael John Slipy, Oakland Park, FL (US); Shigeru Natsume, Brooklyn, NY (US)

(73) Assignee: Magic Leap, Inc., Dania Beach, FL (US)

( * ) Notice: Subject to any disclaimer, the term of this patent is extended or adjusted under 35 U.S.C. 154(b) by 9 days.

This patent is subject to a terminal disclaimer.

(21) Appl. No.: 15/914,811

(22) Filed: Mar. 7, 2018

(65) Prior Publication Data

US 2018/0196269 A1    Jul. 12, 2018

Related U.S. Application Data

(63) Continuation of application No. 15/229,001, filed on Aug. 4, 2016, now Pat. No. 10,073,272, which is a
(Continued)

(51) Int. Cl.
*G02B 27/01* (2006.01)
*G02B 7/12* (2006.01)
(Continued)

(52) U.S. Cl.
CPC .......... *G02B 27/0176* (2013.01); *G02B 7/12* (2013.01); *G02B 27/0179* (2013.01); *G02C 5/04* (2013.01);
(Continued)

(58) Field of Classification Search
USPC ........................................................ 345/800
See application file for complete search history.

(56) References Cited

U.S. PATENT DOCUMENTS 1,937,903 A * 12/1933 McDonnell .............. G02C 5/12
351/138
2,856,813 A * 10/1958 Kudelko ................... G02C 5/20
351/109
(Continued)

FOREIGN PATENT DOCUMENTS

| JP | 2011-100087 A | 5/2011 |
| KR | 1998-031910 U | 8/1998 |
| KR | 1998-057554 U | 10/1998 |

OTHER PUBLICATIONS

International Search Report and Written Opinion dated Jan. 8, 2015, for corresponding International Application No. PCT/US2014/060955, 15 pages.

*Primary Examiner* — Chineyere D Wills-Burns
(74) *Attorney, Agent, or Firm* — Seed IP Law Group LLP

(57) ABSTRACT

A virtual or augmented reality headset is provided having a frame, a pair of virtual or augmented reality eyepieces, and an interpupillary distance adjustment mechanism. The frame includes opposing arm members and a bridge positioned intermediate the opposing arm members. The adjustment mechanism is coupled to the virtual or augmented reality eyepieces and operable to simultaneously move the eyepieces to adjust the interpupillary distance of the eyepieces.

15 Claims, 14 Drawing Sheets

Related U.S. Application Data continuation of application No. 14/516,180, filed on Oct. 16, 2014, now Pat. No. 9,470,906.

(60) Provisional application No. 61/891,801, filed on Oct. 16, 2013.

(51) Int. Cl.
*G02C 5/04* (2006.01)
*G02C 5/08* (2006.01)
*G06T 19/00* (2011.01)

(52) U.S. Cl.
CPC .............. *G02C 5/045* (2013.01); *G02C 5/08* (2013.01); *G06T 19/006* (2013.01); *G02B 27/0172* (2013.01); *G02B 2027/0154* (2013.01); *G02B 2027/0169* (2013.01); *G02B 2027/0178* (2013.01); *G02B 2027/0181* (2013.01)

(56) References Cited

U.S. PATENT DOCUMENTS

| | | | |
|---|---|---|---|
| 4,810,080 A * | 3/1989 | Grendol | A61F 9/02 351/138 |
| 5,276,471 A | 1/1994 | Yamauchi et al. | |
| 6,333,814 B1 | 12/2001 | Chang et al. | |
| 9,470,906 B2 * | 10/2016 | Kaji | G02C 5/045 |
| 10,073,272 B2 * | 9/2018 | Kaji | G02C 5/045 |
| 2007/0057867 A1 * | 3/2007 | Mizuuchi | G02B 7/12 345/8 |
| 2009/0231544 A1 * | 9/2009 | Mahloch | A61B 3/04 351/246 |
| 2011/0043436 A1 * | 2/2011 | Yamamoto | G02B 27/0172 345/8 |
| 2013/0037578 A1 | 2/2013 | Mortazavi | |
| 2013/0050642 A1 * | 2/2013 | Lewis | A61B 3/113 351/204 |

* cited by examiner

VIRTUAL OR AUGMENTED REALITY HEADSETS HAVING ADJUSTABLE INTERPUPILLARY DISTANCE

BACKGROUND

Technical Field

This disclosure generally relates to virtual or augmented reality headsets, and more particularly to virtual or augmented reality headsets wherein the interpupillary distance of the eyepieces is adjustable.

Description of the Related Art

Virtual or augmented reality headsets have long been proven invaluable for many applications, spanning the fields of scientific visualization, medicine and military training, engineering design and prototyping, tele-manipulation and tele-presence, and personal entertainment systems. In virtual reality systems, computer-generated virtual scenes are generally provided on an opaque display. In mixed and augmented reality systems, computer-generated virtual scenes or objects are combined with the views of a real-world scene on a see-through display. In many virtual or augmented reality headsets, virtual or augmented scenes are displayed on separate eyepieces. The interpupillary distance between the optical centers of such eyepieces are often fixed, and corrections that may be needed to adjust for variations in users having different interpupillary distances is made via software to provide corrective display adjustments. In some instances, the interpupillary distance between the optical centers of eyepieces may be mechanically adjustable; however, in such instances, adjustment devices can suffer from various drawbacks. For example, the adjustment mechanisms may be overly complex, bulky, lack precision and/or include a limited range of motion.

BRIEF SUMMARY

Embodiments described herein provide virtual or augmented reality headsets with robust and efficient form factors that enable simultaneous movement of viewer eyepieces along one or more linear rails to provide interpupillary distance adjustment.

A virtual or augmented reality headset may be summarized as including a frame, a pair of virtual or augmented reality eyepieces, and an adjustment mechanism coupled to both of the pair of virtual or augmented reality eyepieces. The frame may include opposing arm members, a bridge positioned intermediate the opposing arm members, and a plurality of linear rails. At least one linear rail may be provided at each of opposing sides of the frame defined by a central reference plane. The pair of virtual or augmented reality eyepieces each have an optical center and may be movably coupled to the plurality of linear rails of the frame to enable adjustment of an interpupillary distance between the optical centers. The adjustment mechanism may be operable to simultaneously move the pair of virtual or augmented reality eyepieces in adjustment directions aligned with the plurality of linear rails to adjust the interpupillary distance.

The virtual or augmented reality eyepieces may be movable between a narrowest configuration and a widest configuration, and a difference between the interpupillary distance in the widest configuration and the interpupillary distance in the narrowest configuration may be between about 20 mm and about 24 mm.

The adjustment mechanism may be coupled to the bridge of the frame and may include a manipulable actuator coupled to the virtual or augmented reality eyepieces for selectively adjusting a linear position of each of the virtual or augmented reality eyepieces simultaneously. The frame may further include a lock to selectively fix the virtual or augmented reality eyepieces in a selected linear position along the plurality of linear rails.

The adjustment mechanism may include a manipulable actuator manually operable by a user and one or more links physically may couple the manipulable actuator to the virtual or augmented reality eyepieces. The headset may further include a selectively removable cover that is selectively positionable to alternatively prevent access to the manipulable actuator and to provide access to the manipulable actuator by the user. The manipulable actuator may be constrained to translate back and forth in directions perpendicular to the adjustment directions aligned with the plurality of linear rails, and movement of the manipulable actuator in one direction may move the virtual or augmented reality eyepieces toward an expanded configuration while movement of the manipulable actuator in the opposite direction may move the virtual or augmented reality eyepieces toward a collapsed configuration. The manipulable actuator may be accessible to the user while the headset is worn.

The adjustment mechanism may include one or more linear actuators, such as, for example, a piezoelectric linear actuator or a motor-driven lead screw.

The bridge of the frame may include a nosepiece to engage a nose of the user and support the virtual or augmented reality eyepieces in front of the user's eyes. The nosepiece may be removably coupleable to a base portion of the bridge to selectively lock the virtual or augmented reality eyepieces in a selected position.

Each virtual or augmented reality eyepiece may be arcuate and may include a medial end and a lateral end. The medial end may be positioned proximate the bridge of the frame and the lateral end may be positioned proximate a temple region of a respective one of the opposing arm members. The frame may include a respective arcuate profile on each of opposing sides of the central reference plane to at least partially nest with a respective one of the virtual or augmented reality eyepieces when the virtual or augmented reality eyepieces are in a narrowest configuration in which the interpupillary distance is at a minimum. The plurality of linear rails may include at least two linear rails on each of opposing sides of the frame to guide a respective one of the virtual or augmented reality eyepieces, and wherein, for each of the opposing sides of the frame, a first one of the linear rails may be located proximate the bridge to guide the medial end of the respective virtual or augmented reality eyepiece and a second one of the linear rails may be located proximate the temple region to guide the lateral end of the respective virtual or augmented reality eyepiece. Each of the virtual or augmented reality eyepieces may be coupled to at least two linear rails that are offset fore and aft from each other.

The plurality of linear rails of the frame may include at least two linear rails on each of opposing sides of the frame to guide a respective one of the virtual or augmented reality eyepieces, and wherein, for each of the opposing sides of the frame, the two linear rails may be located proximate the bridge to guide a medial end of the respective virtual or augmented reality eyepiece and support the respective virtual or augmented reality eyepiece in a cantilevered manner.

The plurality of linear rails of the frame may include at least two linear rails on each of opposing sides of the frame vertically offset from each other to guide a respective one of the virtual or augmented reality eyepieces. For each of the opposing sides of the frame, the at least two linear rails and the arm member may form a fork structure. For each of the opposing sides of the frame, the two linear rails and a portion of the bridge may form a fork structure that supports the respective one of the virtual or augmented reality eyepieces.

Each of the virtual or augmented reality eyepieces may be supported by a single respective linear rail underlying the eyepiece and supported in space only by a connection to the single respective linear rail. In other instances, each of the virtual or augmented reality eyepieces may be supported by a single respective linear rail positioned above a horizontal plane defined by the optical centers of the pair of virtual or augmented reality eyepieces and supported in space only by a connection to the single respective linear rail.

The bridge and the plurality of rails of the frame may be integrally formed as a single-piece. The bridge, the opposing arm members and the plurality of rails of the frame may be integrally formed as a single-piece.

The frame may further include a central frame portion comprising the bridge, and the opposing arm members may be hingedly connected to the central frame portion.

DETAILED DESCRIPTION

Figure 1:
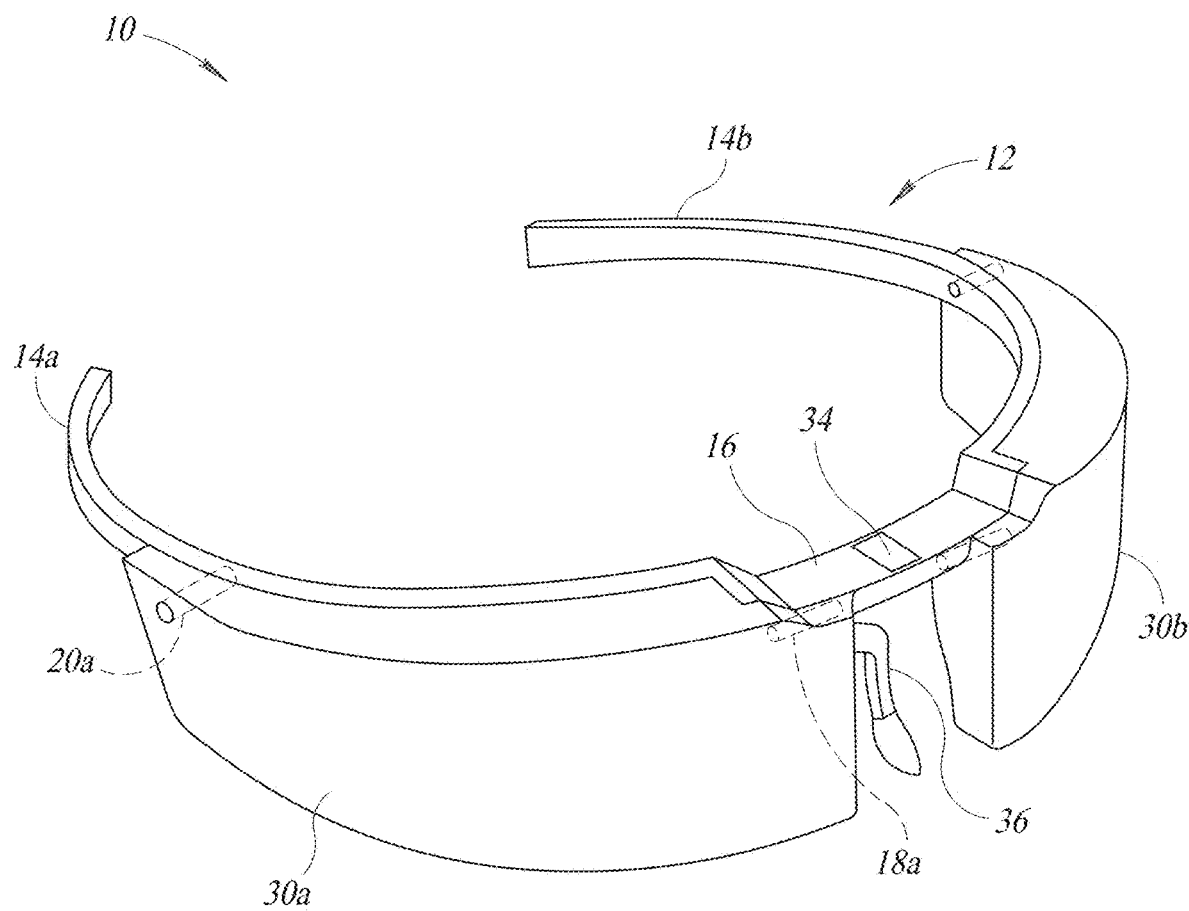
FIG. 1 is a perspective view of a headset according to one embodiment.
Figure 2:
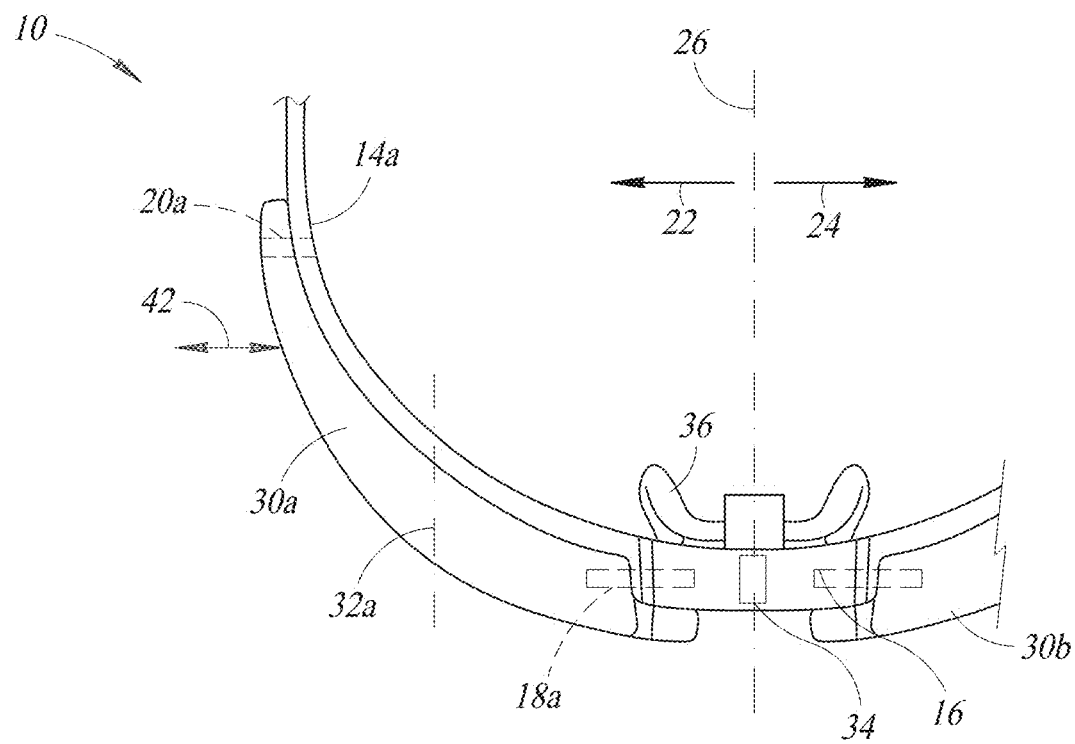
FIG. 2 is a top plan view of a portion of the headset of FIG. 1 shown in a collapsed configuration.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with virtual and augmented reality systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIGS. 1 through 6 show one example embodiment of a virtual or augmented reality headset 10. The headset 10 includes a frame 12 and a pair of virtual or augmented reality eyepieces 30a, 30b supported by the frame 12. The frame 12 has opposing arm members 14a, 14b, a bridge 16 positioned intermediate the opposing arm members 14a, 14b, and a plurality of linear rails 18a, 18b, 20a, 20b. More particularly, two linear rails 18a, 18b, 20a, 20b are provided at each of opposing sides 22, 24 of the frame 12 defined by a central reference plane 26.

The pair of virtual or augmented reality eyepieces 30a, 30b each has an optical center 32a, 32b, a distance between which defines an interpupillary distance IPD. The eyepieces 30a, 30b are movably coupled to the plurality of linear rails 18a, 18b, 20a, 20b to enable adjustment of the interpupillary distance IPD as desired to correspond to or more closely correspond to an actual interpupillary distance between the pupils of a wearer.

Figure 3:
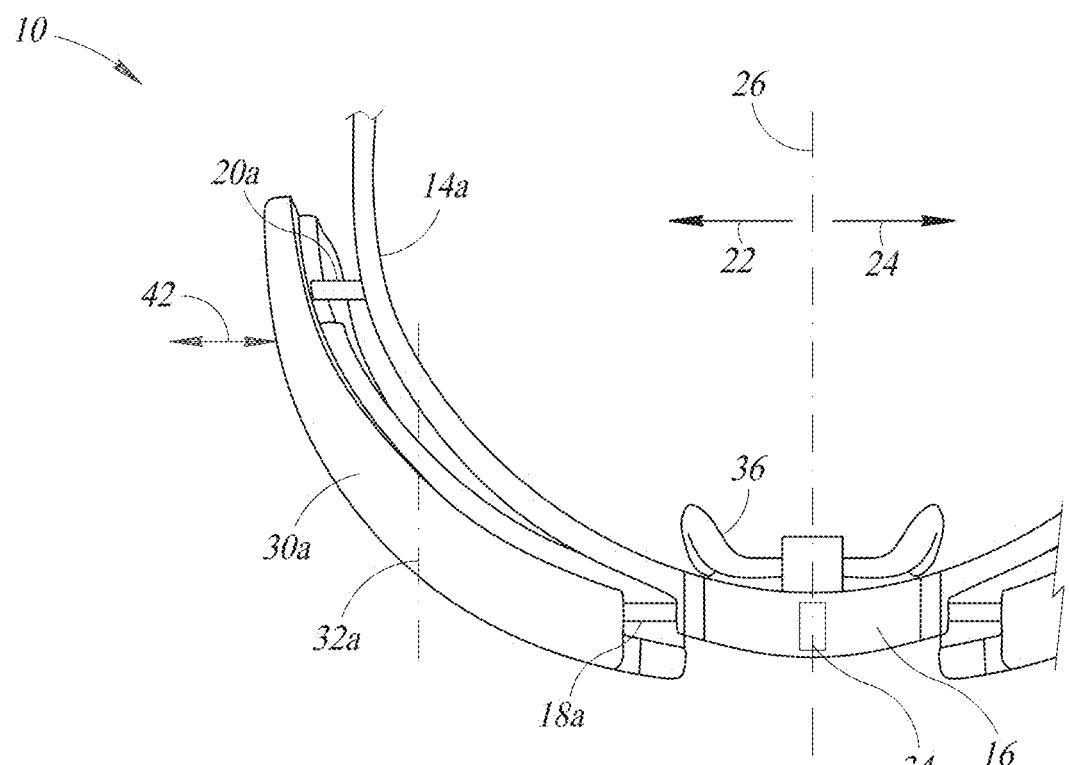
FIG. 3 is a top plan view of a portion of the headset of FIG. 1 shown in an expanded configuration.
Figure 4:
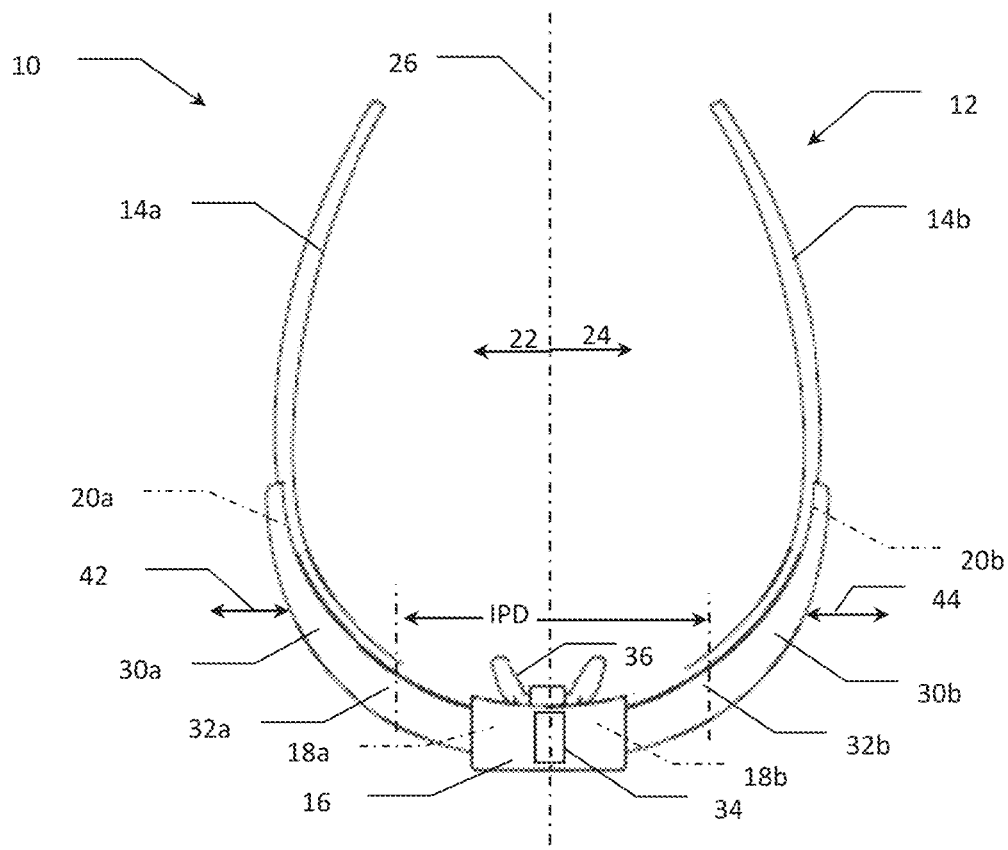
FIG. 4 is a top plan view of the headset of FIG. 1 shown in the collapsed configuration.
Figure 5:
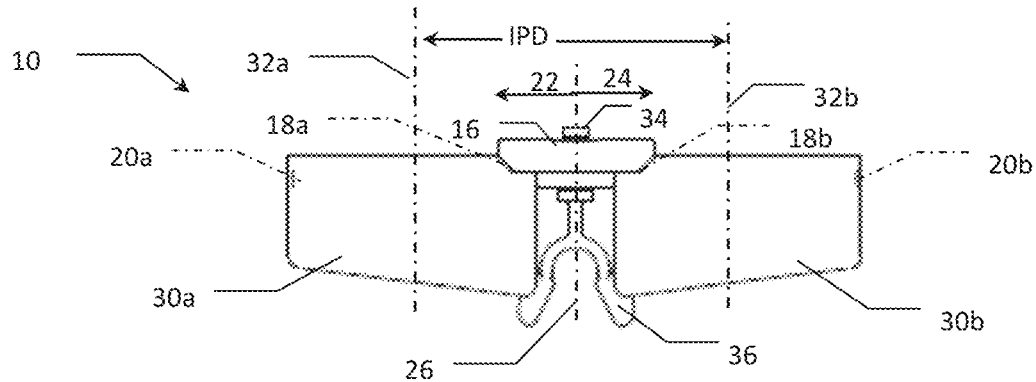
FIG. 5 is a front elevational view of the headset of FIG. 1 shown in the collapsed configuration.
Figure 6:
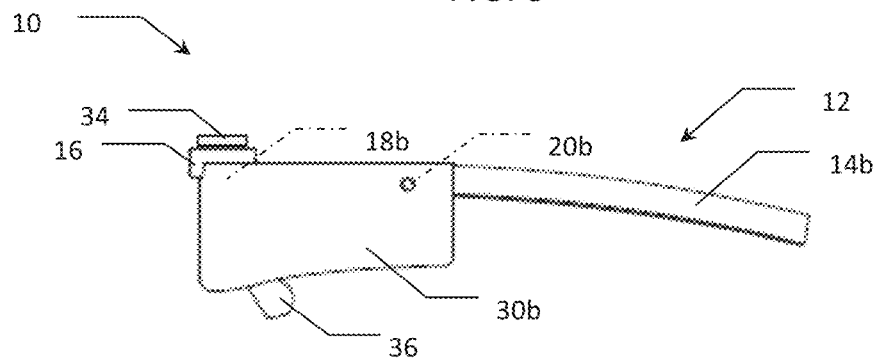
FIG. 6 is a side elevational view of the headset of FIG. 1 shown in the collapsed configuration.
Figure 7:
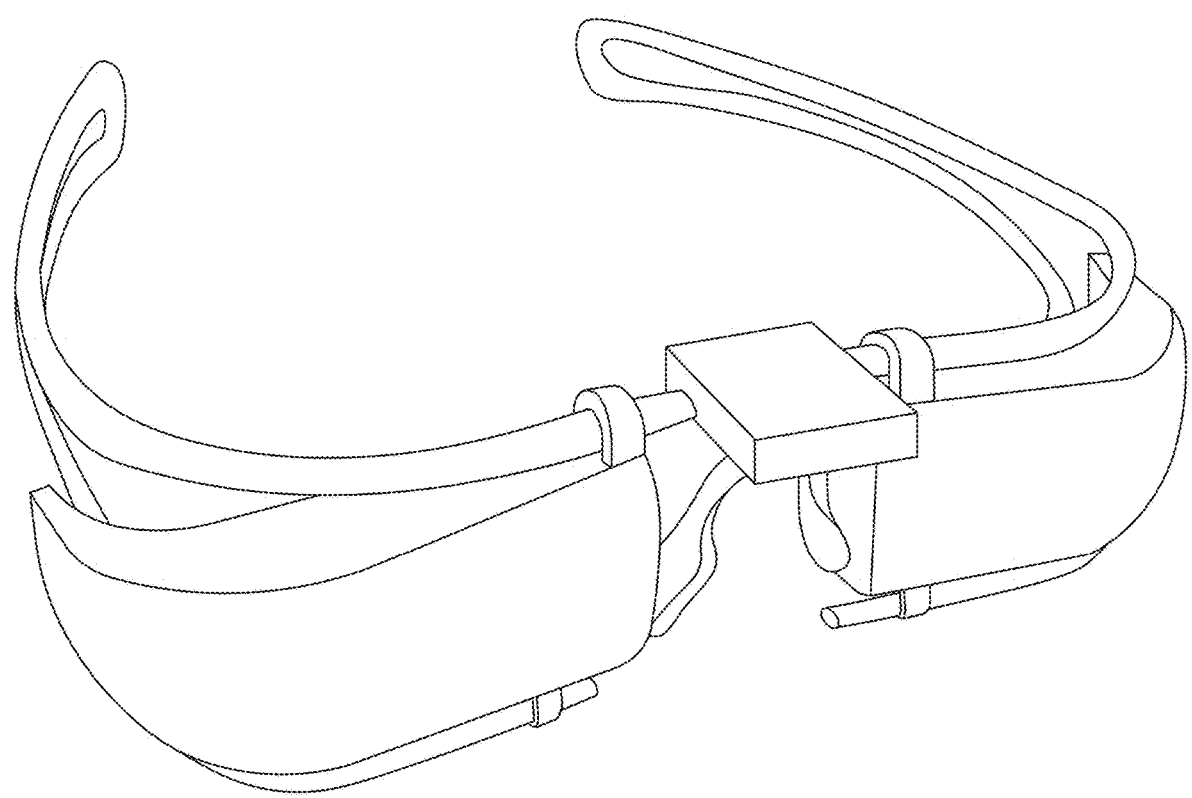
FIG. 7 is a perspective view of a headset according to another embodiment.
Figure 8:
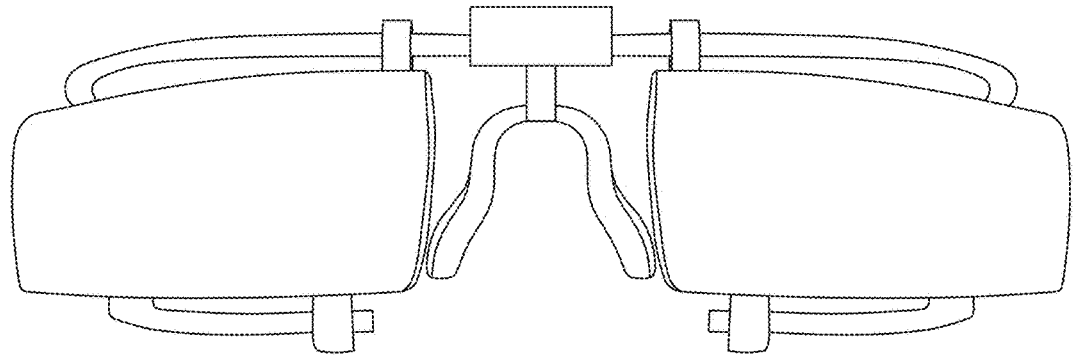
FIG. 8 is a front elevational view of the headset of FIG. 7 shown in a collapsed configuration.

The headset 10 further includes an adjustment mechanism 34 coupled to both of the pair of virtual or augmented reality eyepieces 30a, 30b. The adjustment mechanism 34 is operable to simultaneously move the eyepieces 30a, 30b in adjustment directions 42, 44 aligned with the linear rails 18a, 18b, 20a, 20b to adjust the interpupillary distance IPD. The virtual or augmented reality eyepieces 30a, 30b are movable between a fully collapsed or narrowest configuration (FIGS. 1, 2 and 4-6) and a fully expanded or widest configuration (FIG. 3). The frame 12, eyepieces 30a, 30b, and rails 18a, 18b, 20a, 20b are configured relative to each other such that a difference between the interpupillary distance IPD in the fully expanded or widest configuration and the interpupillary distance IPD in the fully collapsed or narrowest configuration is between about 20 mm and about 24 mm. As such, each individual eyepiece 30a, 30b may be adjusted a distance between about 10 mm and 12 mm. It is appreciated, however, that in some embodiments, more or less adjustment may be provided.

A nosepiece 36 may be provided at the bridge 16 of the frame 12 to engage a nose of the user and support the virtual or augmented reality eyepieces 30a, 30b in front of the user's eyes during use. The nosepiece 36 may be integrally formed as a portion of the bridge 16, fixedly secured to the bridge 16, or removably coupled to the bridge 16. In some embodiments, the nosepiece 36 may be removably coupleable to a base portion of the bridge 16 and impede the travel of the adjustment mechanism 34 to lock the virtual or augmented reality eyepieces 30a, 30b in a selected position. In other instances, a lock may be provided on each eyepiece 30a, 30b, to clamp to a respective one of the linear rails 18a, 18b, 20a, 20b, or vice versa. In this manner, a user may selectively unlock the eyepieces 30a, 30b for adjustment, adjust the eyepieces 30a, 30b transversely to a new interpupillary distance IPD, and lock the eyepieces 30a, 30b in place at the new interpupillary distance IPD. The lock may include, for example, one or more clamps, set screws, clips or other fasteners to impede movement of the adjustment mechanism 34 and/or eyepieces 30a, 30b, or otherwise lock the same. The lock may be spring-biased toward a locked position.

With continued reference to FIGS. 1 through 6, each virtual or augmented reality eyepiece 30a, 30b may be arcuate and include a medial end and a lateral end. The medial end may be positioned proximate the bridge 16 of the frame 12 and the lateral end may be positioned proximate a temple region of a respective one of the opposing arm members 14a, 14b. The frame 12 may include a respective arcuate profile on each of opposing sides 22, 24 of the central reference plane 26 to at least partially nest with a respective one of the virtual or augmented reality eyepieces 30a, 30b when the virtual or augmented reality eyepieces 30a, 30b are in the fully collapsed or narrowest configuration (FIGS. 1, 2 and 5-6) in which the interpupillary distance IPD is at a minimum.

The headset 10 may include a pair of linear rails 18a, 20a and 18b, 20b on each of opposing sides 22, 24 of the frame 12 to guide a respective one of the virtual or augmented reality eyepieces 30a, 30b. In addition, for each of the opposing sides 22, 24 of the frame 12, a first one of the linear rails 18a, 18b may be located proximate the bridge 16 to guide the medial end of the respective virtual or augmented reality eyepiece 30a, 30b and a second one of the linear rails 20a, 20b may be located proximate the temple region to guide the lateral end of the respective virtual or augmented reality eyepiece 30a, 30b. In this manner, each of the virtual or augmented reality eyepieces 30a, 30b may be coupled to at least two linear rails 18a, 20a and 18b, 20b that are offset fore and aft from each other. The linear rails may be protruding rods or telescoping elements that project from a side of the frame 12. In some instances, the rails 18a, 18b, 20a, 20b may be substantially or completely concealed from view when in the fully collapsed or narrowest configuration and/or when in the fully expanded or widest configuration.

As can be appreciated from the embodiment shown in FIGS. 1 through 6, the eyepieces 30a, 30b, may be generally arc-shaped and may move transversely along the linear rails 18a, 18b, 20a, 20b between an extreme medial position nearer the central plane 26 and an extreme lateral position farther from the central plane 26. The eyepieces 30a, 30b may be located at any position between the extreme end positions and secured in place with a lock or other fastening mechanism or fixation method.

FIGS. 7 through 12 show another example embodiment of a virtual or augmented reality headset 110. The headset 110 includes a frame 112 and a pair of virtual or augmented reality eyepieces 130a, 130b supported by the frame 112. The frame 112 has opposing arm members 114a, 114b, a bridge 116 positioned intermediate the opposing arm members 114a, 114b, and a plurality of linear rails 118a, 118b, 120a, 120b. More particularly, two linear rails 118a, 118b, 120a, 120b are provided at each of opposing sides 122, 124 of the frame 112 defined by a central reference plane 126. As shown in FIGS. 7 through 12, the linear rails 118a, 118b, 120a, 120b may transition to curvilinear rails or rail portions beyond the range of adjustability range of the eyepieces 130a, 130b.

Again, the pair of virtual or augmented reality eyepieces 130a, 130b each have an optical center 132a, 132b, a distance between which defines an interpupillary distance IPD. The eyepieces 130a, 130b are movably coupled to the plurality of linear rails 118a, 118b, 120a, 120b to enable adjustment of the interpupillary distance IPD as desired to correspond to or more closely correspond to an actual interpupillary distance between the pupils of a wearer.

Figure 9:
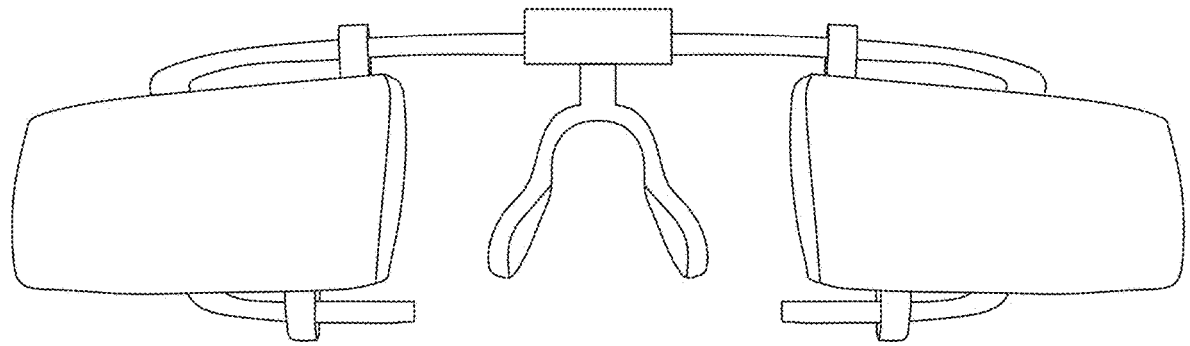
FIG. 9 is a front elevational view of the headset of FIG. 7 shown in an expanded configuration.
Figure 10:
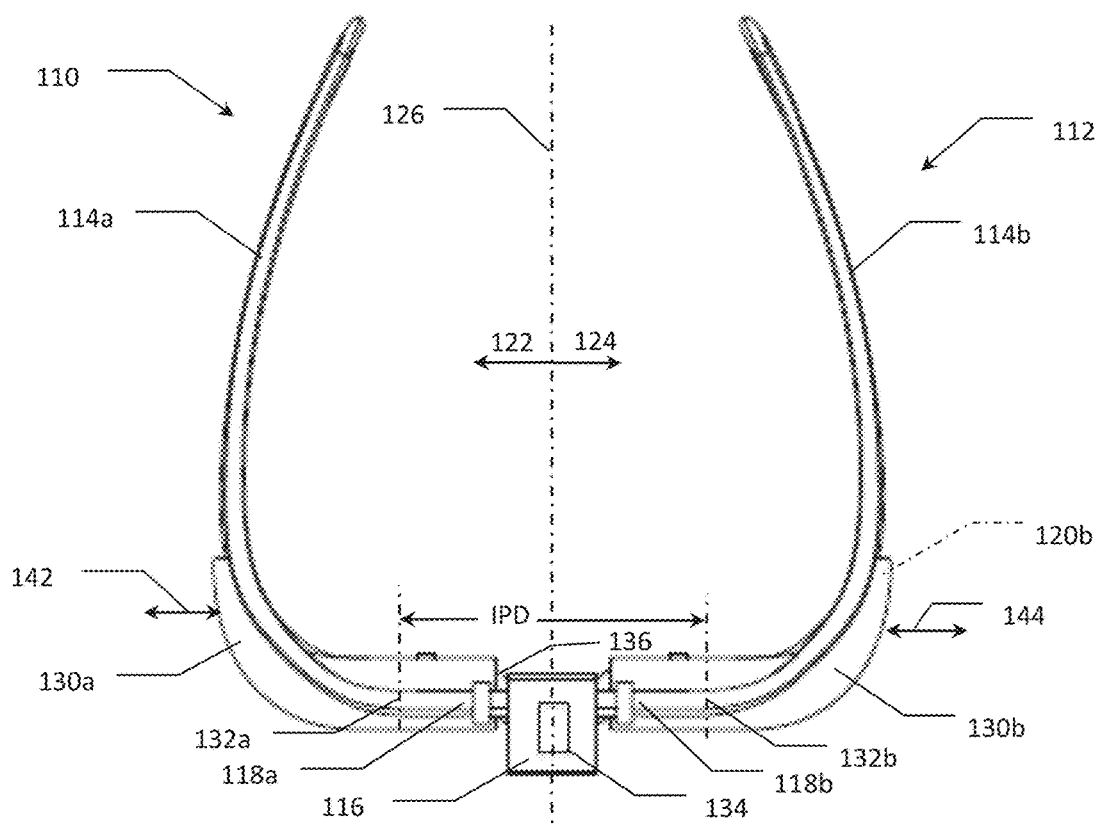
FIG. 10 is a top plan view of the headset of FIG. 7 shown in the collapsed configuration.
Figure 11:
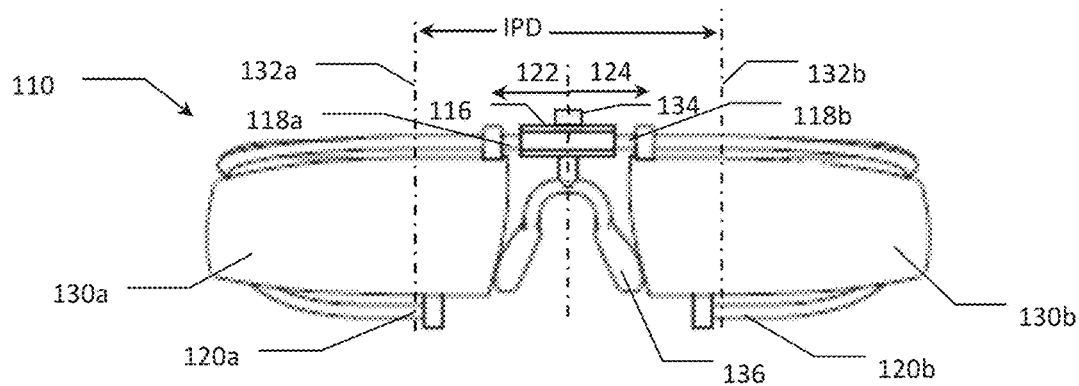
FIG. 11 is a front elevational view of the headset of FIG. 7 shown in the collapsed configuration.
Figure 12:
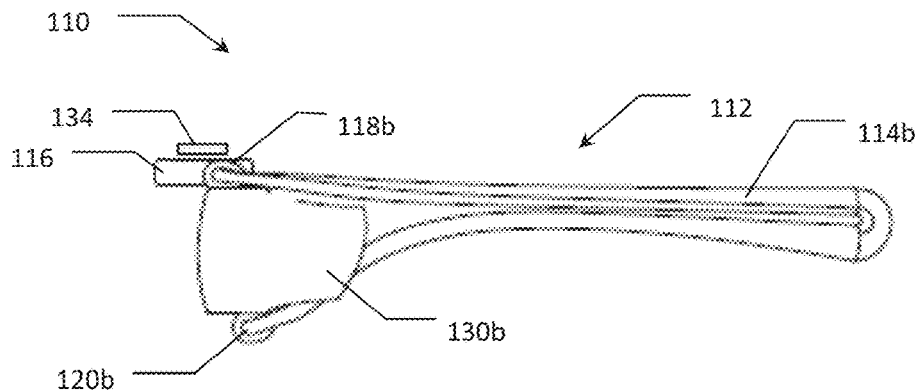
FIG. 12 is a side elevational view of the headset of FIG. 7 shown in the collapsed configuration.
Figure 13:
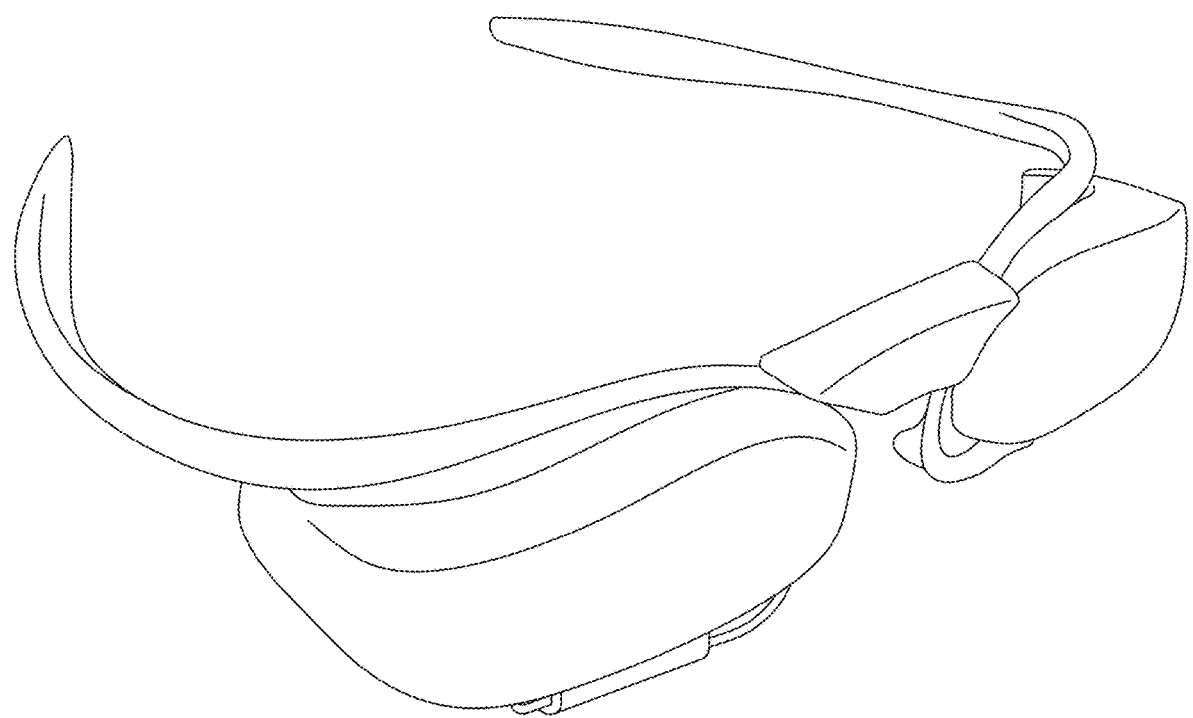
FIG. 13 is a perspective view of a headset according to another embodiment.
Figure 14:
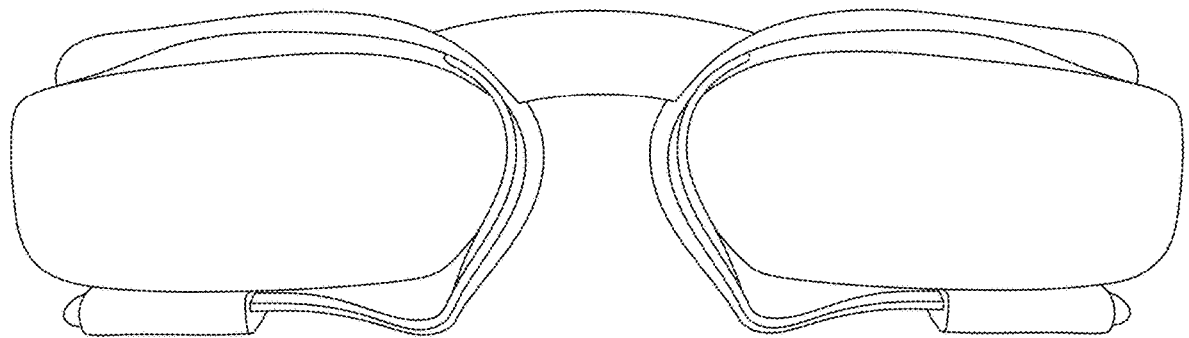
FIG. 14 is a front elevational view of the headset of FIG. 13 shown in a collapsed configuration.

The headset 110 further includes an adjustment mechanism 134 coupled to both of the pair of virtual or augmented reality eyepieces 130a, 130b. The adjustment mechanism 134 is operable to simultaneously move the eyepieces 130a, 130b in adjustment directions 142, 144 aligned with the linear rails 118a, 118b, 120a, 120b to adjust the interpupillary distance IPD. The virtual or augmented reality eyepieces 130a, 130b are movable between a fully collapsed or narrowest configuration (FIGS. 7, 8 and 10-12) and a fully expanded or widest configuration (FIG. 9). The frame 112, eyepieces 130a, 130b, and rails 118a, 118b, 120a, 120b are configured relative to each other such that a difference between the interpupillary distance IPD in the fully expanded or widest configuration and the interpupillary distance IPD in the fully collapsed or narrowest configuration is between about 20 mm and about 24 mm. As such, each individual eyepiece 130a, 130b may be adjusted a distance between about 10 mm and 12 mm. It is appreciated, however, that in some embodiments, more or less adjustment may be provided.

Again, a nosepiece 136 may be provided at the bridge 116 of the frame 112 to engage a nose of the user and support the virtual or augmented reality eyepieces 130a, 130b in front of the user's eyes during use. The nosepiece 136 may be integrally formed as a portion of the bridge 116, fixedly secured to the bridge 116, or removably coupled to the bridge 116. In some embodiments, the nosepiece 136 may be removably coupleable to a base portion of the bridge 116 and impede the travel of the adjustment mechanism 134 to lock the virtual or augmented reality eyepieces 130a, 130b in a selected position. In other instances, a lock may be provided on each eyepiece 130a, 130b, to clamp to a respective one of the linear rails 118a, 118b, 120a, 120b, or vice versa. In this manner, a user may selectively unlock the eyepieces 130a, 130b for adjustment, adjust the eyepieces 130a, 130b transversely to a new interpupillary distance IPD, and lock the eyepieces 130a, 130b in place at the new interpupillary distance IPD. The lock may include, for example, one or more clamps, set screws, clips or other fasteners to impede movement of the adjustment mechanism 134 and/or eyepieces 130a, 130b, or otherwise fix the same in place. The lock may be spring-biased toward a locked position.

With continued reference to FIGS. 7 through 12, each virtual or augmented reality eyepiece 130a, 130b may be arcuate and include a medial end and a lateral end. The medial end may be positioned proximate the bridge 116 of the frame 112 and the lateral end may be positioned proximate a temple region of a respective one of the opposing arm members 114a, 114b. The frame 112 may include a respective arcuate profile on each of opposing sides 122, 124 of the central reference plane 126 that generally reflects that of the respective virtual or augmented reality eyepieces 130a, 130b.

The headset 110 may include a pair of linear rails 118a, 120a and 118b, 120b on each of opposing sides 122, 124 of the frame 112 to guide a respective one of the virtual or augmented reality eyepieces 130a, 130b. In addition, for each of the opposing sides 122, 124 of the frame 112, a first one of the linear rails 118a, 118b may be located proximate the bridge 116 at an upper region of the headset 110 to guide an upper portion of the medial end of the respective virtual or augmented reality eyepiece 130a, 130b and a second one of the linear rails 120a, 120b may be located proximate the bridge 116 at a lower region of the headset 110 to guide a lower portion of the medial end of the respective virtual or augmented reality eyepiece 130a, 130b. In this manner, at least two linear rails 118a, 120a and 118b, 120b may be provided on each of opposing sides 122, 124 of the frame 112 to guide a respective one of the virtual or augmented reality eyepieces 130a, 130b. The two linear rails 118a, 120a and 118b, 120b on each side 122, 124 may be located proximate the bridge 16 to guide the medial end of the respective virtual or augmented reality eyepiece 130a, 130b and support the eyepiece in a cantilevered manner. The two linear rails 118a, 120a and 118b, 120b on each of opposing sides 122, 124 of the frame 112 may be vertically offset from each other and may form a fork structure with a respective arm member 114a, 114b of the frame 112. The eyepieces 130a, 130b may be received within the tines of the fork structure. In an alternate embodiment, the two linear rails 118a, 120a and 118b, 120b on each of opposing sides 122, 124 of the frame 112 and a portion of the bridge 116 may form a fork structure oriented away from the central plane 126 to support the eyepieces 130a, 130b.

As can be appreciated from the embodiment shown in FIGS. 7 through 12, the eyepieces 130a, 130b, may be generally arc-shaped and may move transversely along the linear rails 118a, 118b, 120a, 120b between an extreme medial position nearer the central plane 126 and an extreme lateral position farther from the central plane 126. The eyepieces 130a, 130b may be located at any position between the extreme end positions and secured in place with a lock or other fastening mechanism or fixation method.

FIGS. 13 through 18 show another example embodiment of a virtual or augmented reality headset 210. The headset 210 includes a frame 212 and a pair of virtual or augmented reality eyepieces 230a, 230b supported by the frame 212. The frame 212 has opposing arm members 214a, 214b, a bridge 216 positioned intermediate the opposing arm members 214a, 214b, and a plurality of linear rails 220a, 220b. More particularly, a single linear rail 220a, 220b is provided at each of opposing sides 222, 224 of the frame 212 defined by a central reference plane 226. As shown in FIGS. 13 through 18, the linear rails 220a, 220b may transition to curvilinear rails or rail portions beyond the range of adjustability range of the eyepieces 230a, 230b.

Again, the pair of virtual or augmented reality eyepieces 230a, 230b each have an optical center 232a, 232b, a distance between which defines an interpupillary distance IPD. The eyepieces 230a, 230b are movably coupled to the plurality of linear rails 220a, 220b to enable adjustment of the interpupillary distance IPD as desired to correspond to or more closely correspond to an actual interpupillary distance between the pupils of a wearer.

Figure 15:
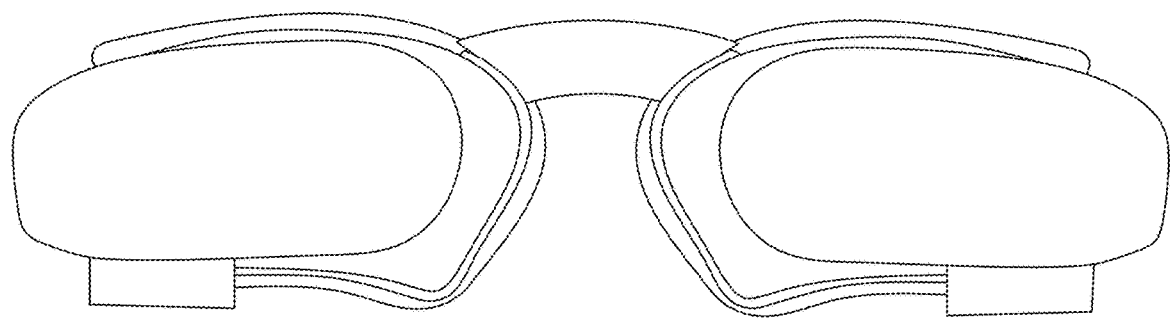
FIG. 15 is a front elevational view of the headset of FIG. 13 shown in an expanded configuration.
Figure 16:
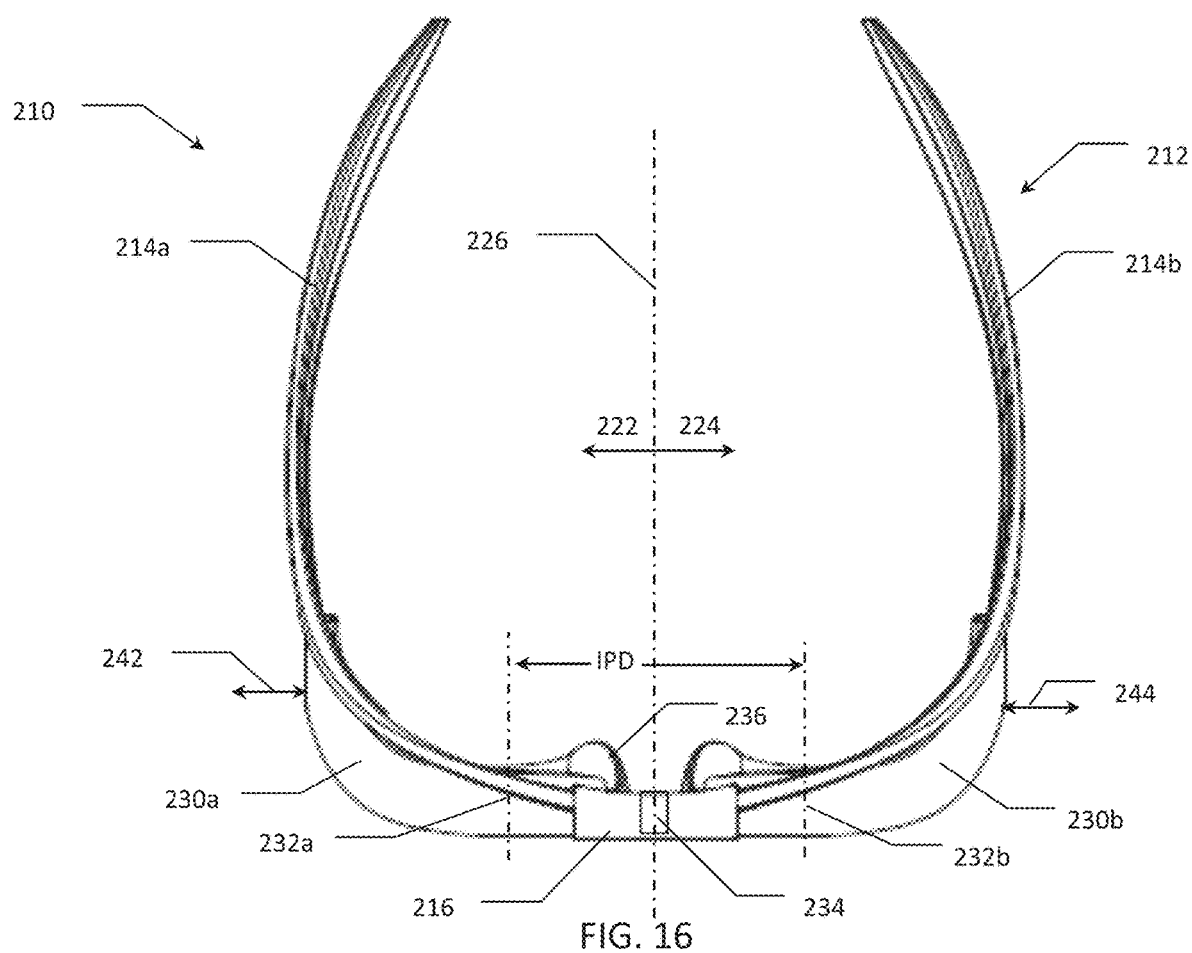
FIG. 16 is a top plan view of the headset of FIG. 13 shown in the collapsed configuration.
Figure 17:
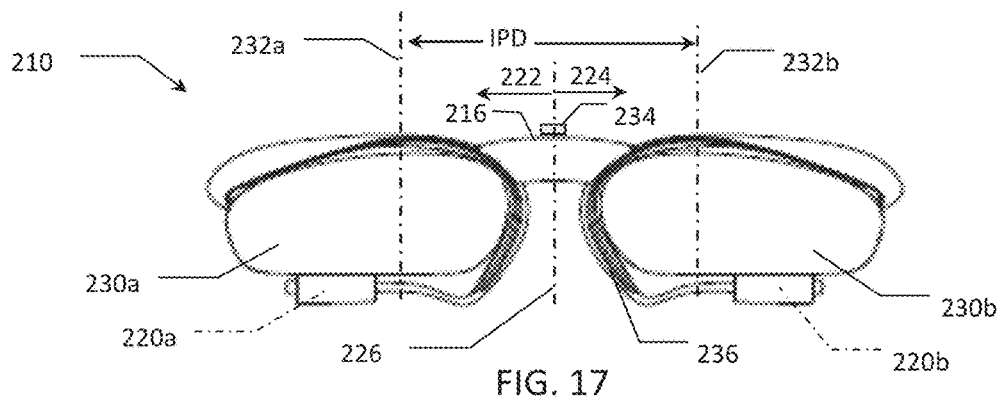
FIG. 17 is a front elevational view of the headset of FIG. 13 shown in the collapsed configuration.
Figure 18:
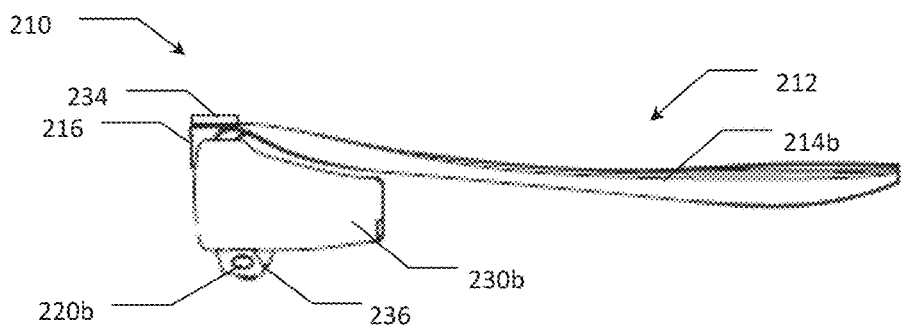
FIG. 18 is a side elevational view of the headset of FIG. 13 shown in the collapsed configuration.
Figure 19:
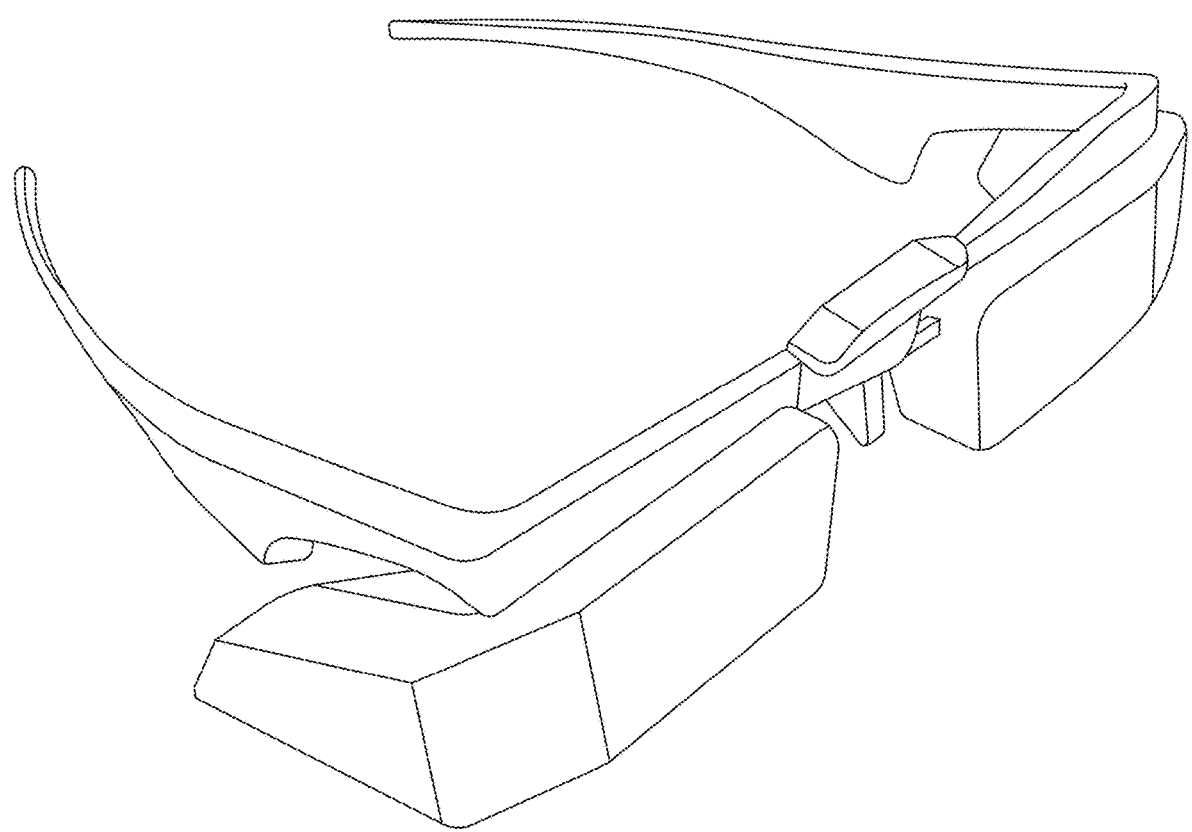
FIG. 19 is a perspective view of a headset according to another embodiment.
Figure 20:
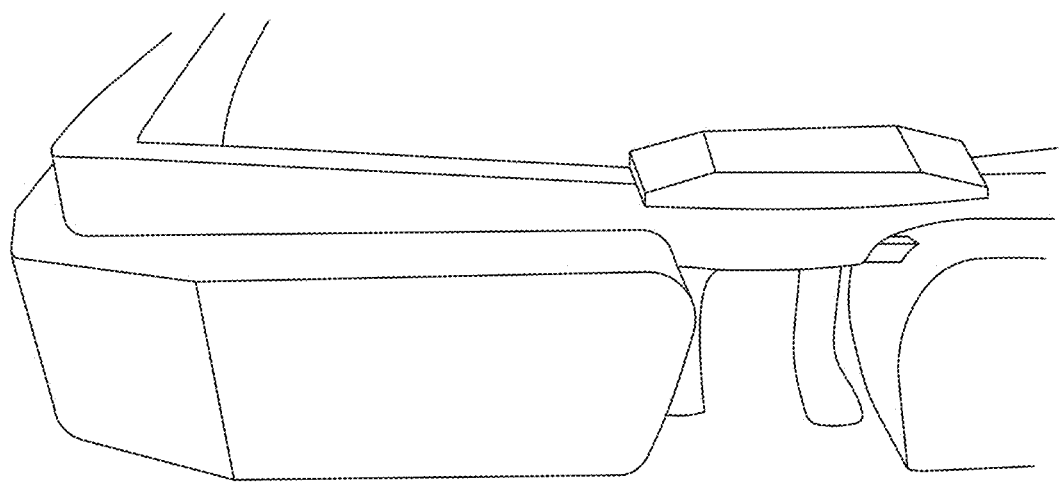
FIG. 20 is a front perspective view of a portion of the headset of FIG. 19 shown in a collapsed configuration.

The headset 210 further includes an adjustment mechanism 234 coupled to both of the pair of virtual or augmented reality eyepieces 230a, 230b. The adjustment mechanism 234 is operable to simultaneously move the eyepieces 230a, 230b in adjustment directions 242, 244 aligned with the linear rails 220a, 220b to adjust the interpupillary distance IPD. The virtual or augmented reality eyepieces 230a, 230b are movable between a fully collapsed or narrowest configuration (FIGS. 13, 14 and 16-18) and a fully expanded or widest configuration (FIG. 15). The frame 212, eyepieces 230a, 230b, and rails 220a, 220b are configured relative to each other such that a difference between the interpupillary distance IPD in the fully expanded or widest configuration and the interpupillary distance IPD in the fully collapsed or narrowest configuration is between about 20 mm and about 24 mm. As such, each individual eyepiece 230a, 230b may be adjusted a distance between about 10 mm and 12 mm. It is appreciated, however, that is some embodiments, more or less adjustment may be provided.

Again, a nosepiece 236 may be provided at the bridge 216 of the frame 212 to engage a nose of the user and support the virtual or augmented reality eyepieces 230a, 230b in front of the user's eyes during use. The nosepiece 236 may be integrally formed as a portion of the bridge 216, fixedly secured to the bridge 216 or removably coupled to the bridge 216. In some embodiments, the nosepiece 236 may be removably coupleable to a base portion of the bridge 216 and impede the travel of the adjustment mechanism 234 to lock the virtual or augmented reality eyepieces 230a, 230b in a selected position. In other instances, a lock may be provided on each eyepiece 230a, 230b, to clamp to a respective one of the linear rails 220a, 220b, or vice versa. In this manner, a user may selectively unlock the eyepieces 230a, 230b for adjustment, adjust the eyepieces 230a, 230b transversely to a new interpupillary distance IPD, and lock the eyepieces 230a, 230b in place at the new interpupillary distance IPD. The lock may include, for example, one or more clamps, set screws, clips or other fasteners to impede movement of the adjustment mechanism 234 and/or eyepieces 230a, 230b, or otherwise fix the same in place. The lock may be spring-biased toward a locked position.

With continued reference to FIGS. 13 through 18, each virtual or augmented reality eyepiece 230a, 230b may be arcuate and include a medial end and a lateral end. The medial end may be positioned proximate the bridge 216 of the frame 212 and the lateral end may be positioned proximate a temple region of a respective one of the opposing arm members 214a, 214b. The frame 212 may include a respective arcuate profile on each of opposing sides 222, 224 of the central reference plane 226 that generally transitions with that of the respective eyepieces 230a, 230b.

The headset 210 includes a single linear rail 220a, 220b on each of opposing sides 222, 224 of the frame 212 to guide a respective one of the virtual or augmented reality eyepieces 230a, 230b. The linear rail 220a, 220b of each side 222, 224 may be located remote from the bridge 216 and may underlay the respective eyepiece 230a, 230b to guide a lower portion of the eyepiece 230a, 230b only.

As can be appreciated from the embodiment shown in FIGS. 13 through 18, the eyepieces 230a, 230b, may be generally arc-shaped and may move transversely along the linear rails 220a, 220b between an extreme medial position nearer the central plane 226 and an extreme lateral position farther from the central plane 226. The eyepieces 230a, 230b may be located at any position between the extreme end positions and secured in place with a lock or other fastening mechanism or fixation method.

FIGS. 19 through 24 show yet another example embodiment of a virtual or augmented reality headset 310. The headset 310 includes a frame 312 and a pair of virtual or augmented reality eyepieces 330a, 330b supported by the frame 312. The frame 312 has opposing arm members 314a, 314b, a bridge 316 positioned intermediate the opposing arm members 314a, 314b, and a plurality of linear rails 318a, 318b. More particularly, a single linear rail 318a, 318b is provided at each of opposing sides 322, 324 of the frame 312 defined by a central reference plane 326. As shown in FIGS. 19 through 24, the linear rails 318a, 318b may be concealed or substantially concealed within the eyepieces 330a, 330b.

Again, the pair of virtual or augmented reality eyepieces 330a, 330b each have an optical center 332a, 332b, a distance between which defines an interpupillary distance IPD. The eyepieces 330a, 330b are movably coupled to the plurality of linear rails 318a, 318b to enable adjustment of the interpupillary distance IPD as desired to correspond to or more closely correspond to an actual interpupillary distance between the pupils of a wearer.

Figure 21:
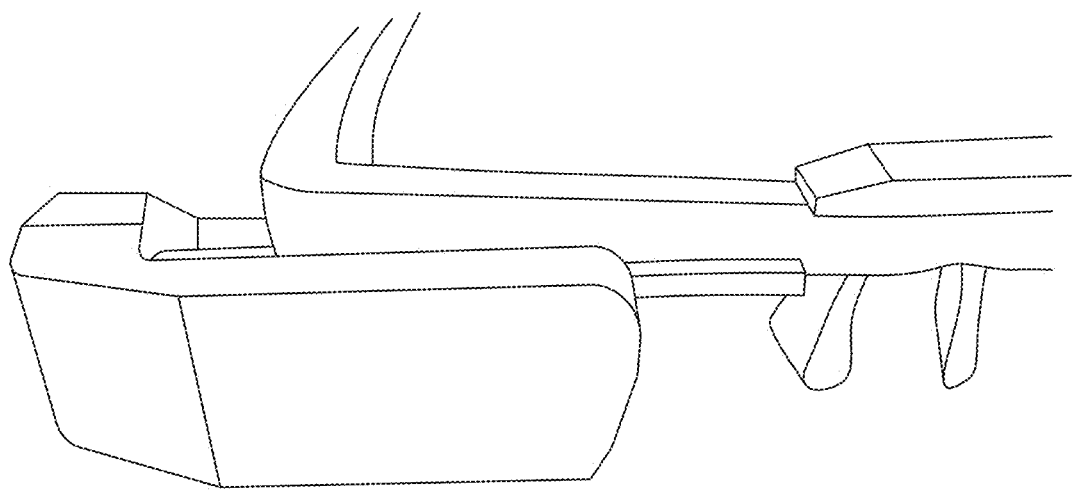
FIG. 21 is a front perspective view of a portion of the headset of FIG. 19 shown in an expanded configuration.
Figure 22:
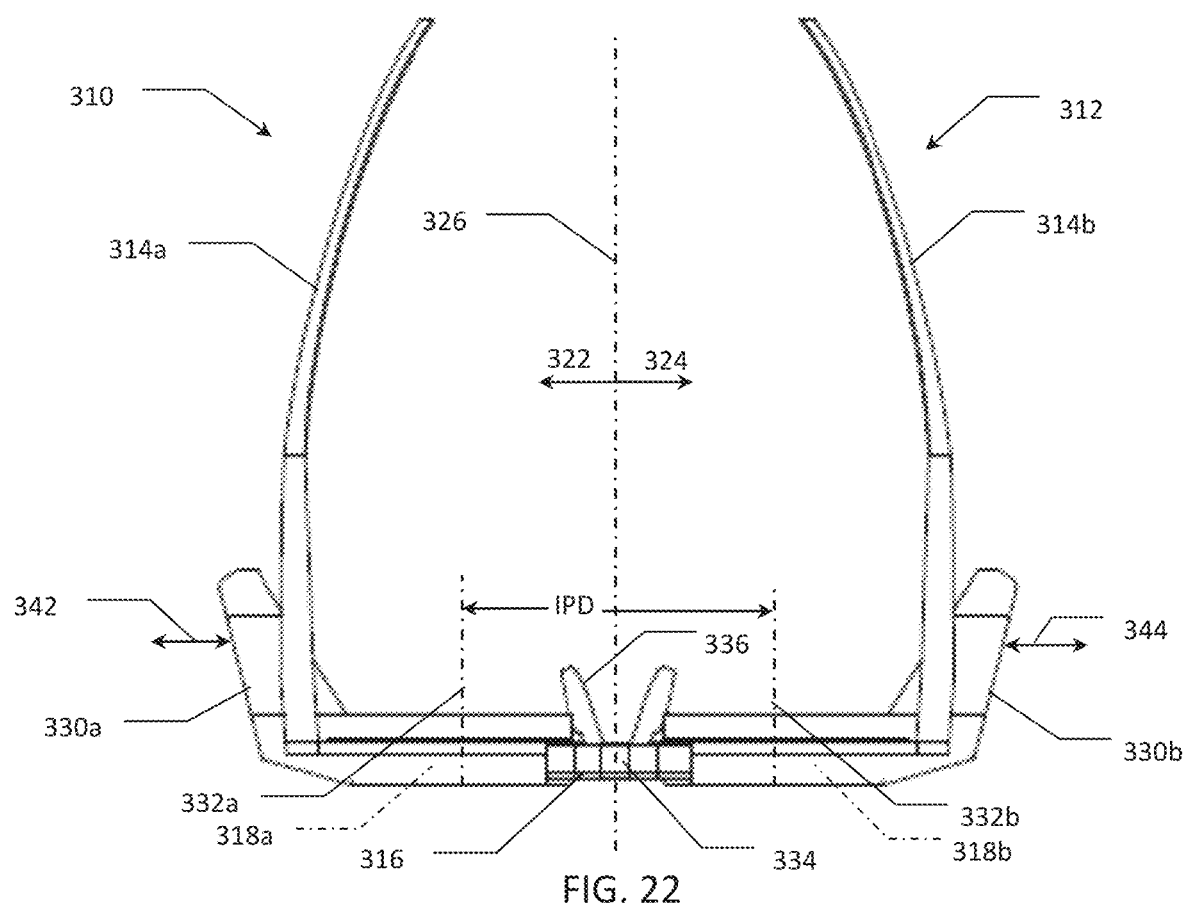
FIG. 22 is a top plan view of the headset of FIG. 19 shown in the collapsed configuration.
Figure 23:
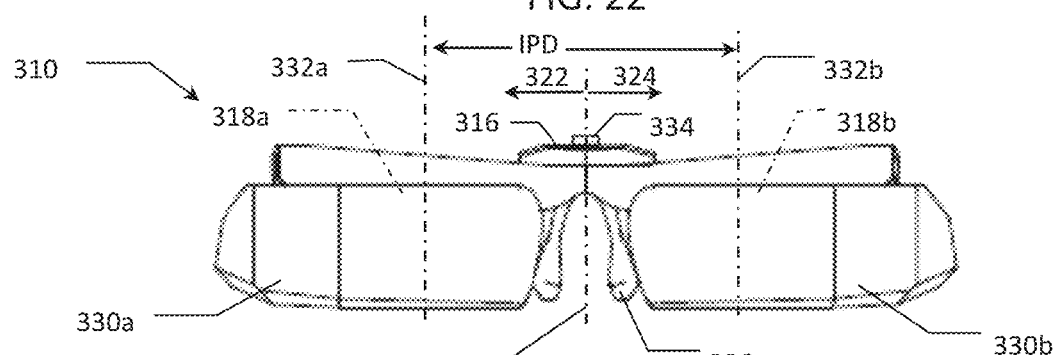
FIG. 23 is a front elevational view of the headset of FIG. 19 shown in the collapsed configuration.
Figure 24:
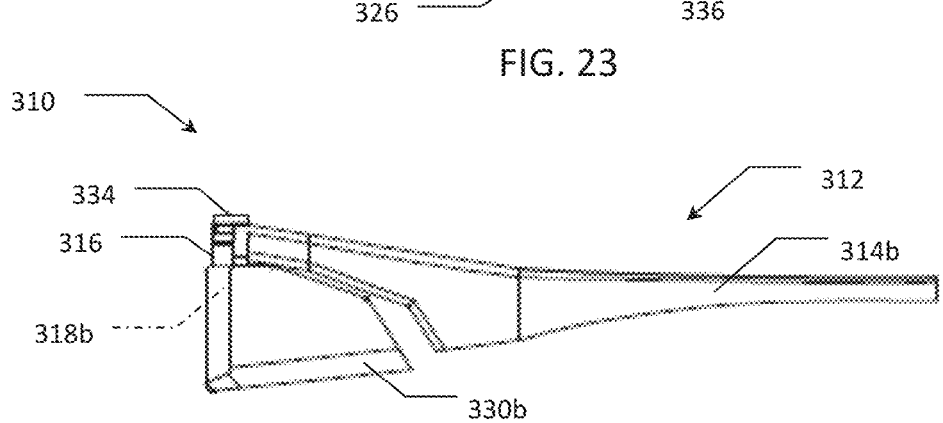
FIG. 24 is a side elevational view of the headset of FIG. 19 shown in the collapsed configuration.

The headset 310 further includes an adjustment mechanism 334 coupled to both of the pair of virtual or augmented reality eyepieces 330a, 330b. The adjustment mechanism 334 is operable to simultaneously move the eyepieces 330a, 330b in adjustment directions 342, 344 aligned with the linear rails 318a, 318b to adjust the interpupillary distance IPD. The virtual or augmented reality eyepieces 330a, 330b are movable between a fully collapsed or narrowest configuration (FIGS. 19, 20 and 22-24) and a fully expanded or widest configuration (FIG. 21). The frame 312, eyepieces 330a, 330b, and rails 318a, 318b are configured relative to each other such that a difference between the interpupillary distance IPD in the fully expanded or widest configuration and the interpupillary distance IPD in the fully collapsed or narrowest configuration is between about 20 mm and about 24 mm. As such, each individual eyepiece 330a, 330b may be adjusted a distance between about 10 mm and 12 mm. It is appreciated, however, that is some embodiments, more or less adjustment may be provided.

Again, a nosepiece 336 may be provided at the bridge 316 of the frame 312 to engage a nose of the user and support the virtual or augmented reality eyepieces 330a, 330b in front of the user's eyes during use. The nosepiece 336 may be integrally formed as a portion of the bridge 316, fixedly secured to the bridge 316 or removably coupled to the bridge 316. In some embodiments, the nosepiece 336 may be removably coupleable to a base portion of the bridge 316 and impede the travel of the adjustment mechanism 334 to lock the virtual or augmented reality eyepieces 330a, 330b in a selected position. In other instances, a lock may be provided on each eyepiece 330a, 330b, to clamp to a respective one of the linear rails 318a, 318b, or vice versa. In this manner, a user may selectively unlock the eyepieces 330a, 330b for adjustment, adjust the eyepieces 330a, 330b transversely to a new interpupillary distance IPD, and lock the eyepieces 330a, 330b in place at the new interpupillary distance IPD. The lock may include, for example, one or more clamps, set screws, clips or other fasteners to impede movement of the adjustment mechanism 334 and/or eyepieces 330a, 330b, or otherwise fix the same in place. The lock may be spring-biased toward a locked position.

With continued reference to FIGS. 19 through 24, each virtual or augmented reality eyepiece 330a, 330b may include a straight-line construction with flared lateral ends. A medial end of each eyepiece 330a, 330b may be positioned proximate the bridge 316 of the frame 312 and the lateral end may be positioned proximate a temple region of a respective one of the opposing arm members 314a, 314b. The frame 312 may include a respective straight-line construction on each of opposing sides 322, 324 of the central reference plane 326 that generally mimics that of the respective eyepieces 330a, 330b.

The headset 310 includes a single linear rail 318a, 318b on each of opposing sides 322, 324 of the frame 312 to guide a respective one of the virtual or augmented reality eyepieces 330a, 330b. The linear rail 318a, 318b of each side 322, 324 may be located above a horizontal plane defined by the optical centers of the eyepiece 330a, 330b to guide an upper portion of the eyepiece 330a, 330b only. The eyepiece 330a, 330b may hang from the rails 318a, 318b.

As can be appreciated from the embodiment shown in FIGS. 19 through 24, the eyepieces 330a, 330b, may have a generally straight-lined construction and may move transversely along the linear rails 318a, 318b between an extreme medial position nearer the central plane 326 and an extreme lateral position farther from the central plane 326. The eyepieces 330a, 330b may be located at any position between the extreme end positions and secured in place with a lock or other fastening mechanism or fixation method.

Figure 25:
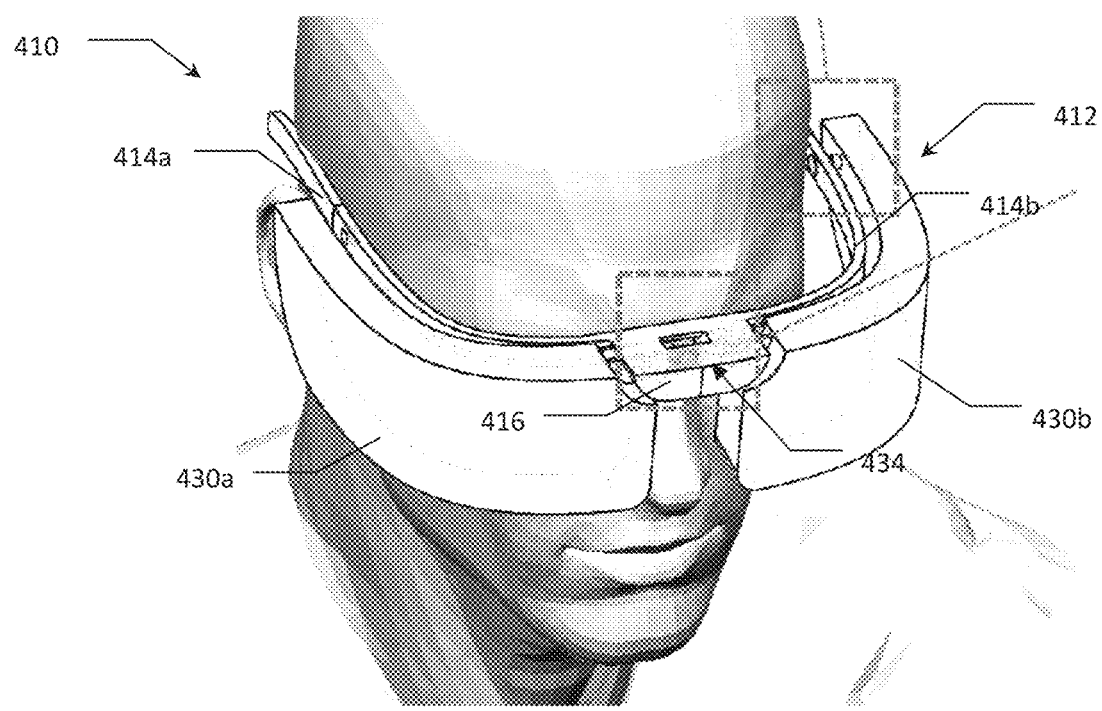
FIG. 25 is a perspective view of a portion of a headset shown in an expanded configuration according to another embodiment.
Figure 26:
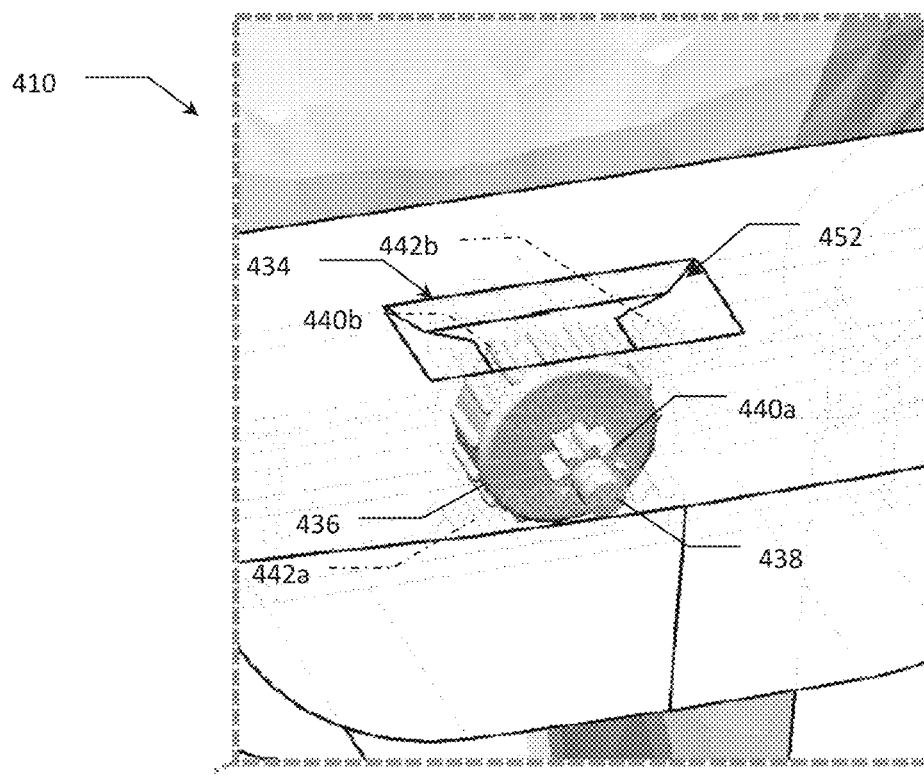
FIG. 26 is an enlarged perspective view of a portion of the headset of FIG. 25 showing an adjustable mechanism.
Figure 27:
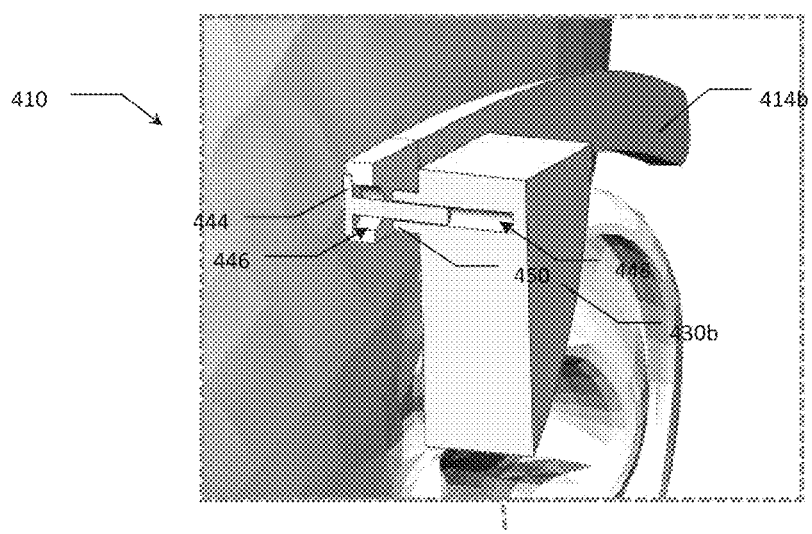
FIG. 27 is a partial cutaway perspective view of the headset of FIG. 25.

FIGS. 25 through 27 show another example embodiment of a virtual or augmented headset 410. The headset 410 includes a frame 412 and a pair of virtual or augmented reality eyepieces 430a, 430b supported by the frame 412. The frame has opposing arm members 414a, 414b, a bridge 416 positioned intermediate the opposing arm members 414a, 414b, and an adjustment mechanism 434. The adjustment mechanism 434 includes a rotary dial 436 with a coaxial output shaft or pin 438 that extends axially and rotatably couples to the bridge 416. A pair of gear pinions 440a, 440b are mounted to the output pin 438 and are positioned at opposite sides of the rotary dial 436. Gear pinions 440b may be a mirror image of gear pinion 440a, simply reflected across a plane that bisects the rotary dial 436 and is perpendicular to a rotational axis thereof. Each of the gear pinions 440a, 440b are sized and shaped to releasably and simultaneously engage a respective gear rack 442a, 442b. Each of the gear racks 442a, 442b are coupleable to a respective virtual or augmented reality eyepiece 430a, 430b.

With continued reference to FIGS. 25 through 27, each opposing arm members 414a, 414b includes a respective guide pin 444 coupled thereto. The guide pins 444 are positioned proximate the temple region and, more particularly, between the temple and ear regions of a wearer. Each of the guide pins 444 extends through respective arm member apertures 446 and is received by a respective eyepiece aperture 448. A cylindrical projection 450 extends inwardly from each eyepiece aperture 448. The cylindrical projection 450 is sized and shaped to be slideably received by the respective arm member apertures 446 when the headset 410 is in a collapsed or narrowest configuration. In some embodiments, the arm member apertures 446 may include a counterbore or a countersink to allow the guide pin 444 head to sit at least flush with an interior surface of the opposing arm members 414a, 414b to substantially or completely conceal the guide pin 444 from view when in the fully collapsed or narrowest configuration and/or when in the fully expanded or widest configuration. Further, in some embodiments, the opposing arm member apertures 446 may include bushings coupled thereto in order to reduce wear and friction, guide, or constrain the motion of the headset 410. The bushings may be lubricated or unlubricated.

With continued reference to FIGS. 25-27, rotation of the gear pinions 440a, 440b via the rotary dial 436 in a clockwise direction causes the gear pinions 440a, 440b to engage the respective gear racks 442a, 442b. Such engagement moves the virtual or augmented reality eyepieces 430a, 430b approximately equal distances simultaneously and outwardly relative to the rotary dial 436. At the temporal or lateral end, moreover, the guide pins 444 assist in guiding the virtual or augmented reality eyepieces 430a, 430b as they move outwardly relative to the opposing arm members 414a, 414b. Conversely, counterclockwise rotation of the rotary dial 436 causes the gear racks 442a, 442b to move approximately equal distances simultaneously and inwardly relative to the rotary dial 436. Similarly, the guide pins 444 assist in guiding the virtual or augmented reality eyepieces 430a, 430b as they move inwardly relative to the opposing arm members 414a, 414b.

By manipulating the adjustment mechanism 434 to move the virtual or augmented reality eyepieces 430a, 430b inwardly or outwardly, the interpupillary distance IPD can be conveniently controlled by a user. By way of example, in the illustrated embodiment of the headset 410, the gear racks 442a, 442b are sized and shaped to allow movement of the virtual or augmented reality eyepieces 430a, 430b relative to the rotary dial 436 such that a difference between the interpupillary distance IPD in the fully expanded or widest configuration (FIGS. 25-27) and the interpupillary distance IPD in the fully collapsed or narrowest configuration is between 10 mm and about 12 mm. It is appreciated, however, that in some embodiments, more or less adjustment may be provided.

To allow the user access to the rotary dial 436, the bridge 416 includes a recess 452 through which a portion of the rotary dial 436 protrudes outwardly. The user may rotate the rotary dial 436 to adjust the interpuppilary distance IPD until the optimal interpuppilary distance IPD for the user is determined. Once the optimal interpuppilary distance IPD is set, each of the virtual or augmented reality eyepieces 430a, 430b can be locked in place through a lock. The lock may include, for example, one or more clamps, set screws, clips or other fasteners to impede movement of the adjustment mechanism 34 and/or eyepieces 430a, 430b, or otherwise lock the same. The lock may be spring-biased toward a locked position.

The adjustable mechanism 434 may further include a cover 453 to releasably attach to the recess 452 in the bridge 416. The cover 453 may substantially seal the adjustable mechanism 434 from the environment, such as water or moisture ingress, and may also selectively control access to the rotary dial 436 during use. In some embodiments, the cover 453 may include male connectors that can snap into place when matingly received by a female connector located in the recess 452 of the bridge 416. In other embodiments, the cover 453 may include any number of posts or pegs that may extend outwardly. The posts or pegs may be received by holes or dents in the recess 452 of the bridge 416 to releasably secure the cover 453 to the bridge 416. As can be appreciated from the foregoing, other mechanisms may be used to releasably attach the cover 453 to the headset 410.

Figure 28:
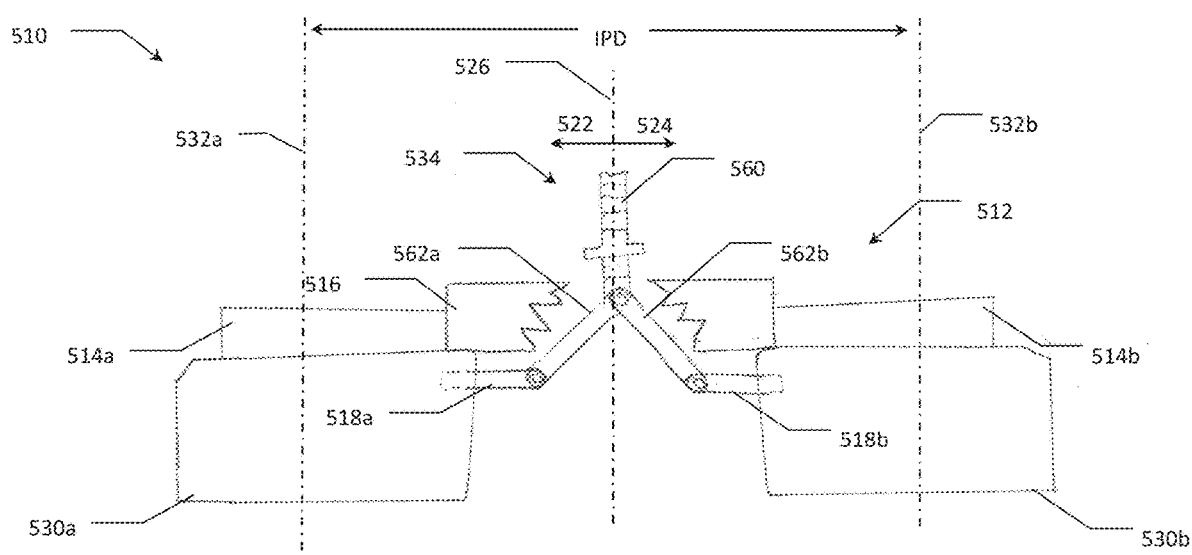
FIG. 28 is a front elevational view of a headset shown in an expanded configuration according to yet another embodiment.

FIG. 28 shows another example embodiment of a virtual or augmented headset 510 in an expanded or widest configuration. The headset includes a frame 512 and a pair of virtual or augmented reality eyepieces 530a, 530b supported by the frame 512. The frame has opposing arm members 514a, 514b, a bridge 516 positioned intermediate the opposing arm members 514a, 514b, and a plurality of linear rails 518a, 518b. More particularly, a single linear rail 518a, 518b is provided at each of opposing sides 522, 524 of the frame 512 defined by a central reference plane 526.

Again, the pair of virtual or augmented reality eyepieces 530a, 530b each has an optical center 532a, 532b, a distance between which defines an interpupillary distance IPD. The eyepieces 530a, 530b are movably coupled to the plurality of linear rails 518a, 518b to enable adjustment of the interpupillary distance IPD as desired to correspond to or more closely correspond to an actual interpupillary distance IPD between the pupils of a wearer.

The headset 510 further includes an adjustment mechanism 534 coupled to both of the pair of virtual or augmented reality eyepieces 530a, 530b. The adjustment mechanism illustrated in FIG. 28 includes a linear actuator device 560 to convert rotary motion into linear motion, such as a lead screw, jackscrew, ball screw, roller screw, or other types of devices that may mechanically convert rotary motion into linear motion. By way of example, FIG. 28 illustrates a lead screw with some of the hardware, such as a control knob, nuts, etc., removed for clarity. The linear actuator device 560 is coupled to a pair of links 562a, 562b. The links 562a, 562b are angularly spaced apart relative to each other and about the central reference plane 526. At a lower end, the links 562a, 562b are coupled to the respective linear rails 518a, 518b.

The adjustment mechanism 534 allows the user to manipulate the interpupillary distance IPD by moving the virtual or augmented reality eyepieces 530a, 530b inwardly or outwardly relative to the adjustment mechanism 534. The user can rotate the control knob of the linear actuator device 560 in a clockwise direction, which causes a linear extension of the linear actuator device 560 shaft. This linear extension causes an increase in the angular displacement of the links 562a, 562b relative to one another, resulting in an outward linear translation of the respective rails 518a, 518b and the virtual or augmented reality eyepieces 530a, 530b. Conversely, the user can rotate the control knob of the linear actuator device 560 in a counterclockwise direction to cause an inward movement of the virtual or augmented reality eyepieces 530a, 530b in a similar manner.

The adjustment mechanism 534 can be substantially or completely concealed from view by housing the adjustment mechanism 534 within the bridge 516. The bridge 516 may further include a recess to allow a portion of the control knob to protrude outwardly. A cover may releasably attach to the recess in the bridge 516. The cover may substantially seal the adjustable mechanism 534 from the environment, such as water or moisture ingress, and may also selectively control access to the control knob during use. In some embodiments, the cover may include male connectors that can snap into place when matingly received by a female connector located in the recess of the bridge 516. In other embodiments, the cover may include any number of posts or pegs that may extend outwardly. The posts or pegs may be received by holes or dents in the recess of the bridge 516 to releasably secure the cover to the bridge 516. As can be appreciated from the foregoing, other mechanisms may be used to releasably attach the cover to the headset 510.

In some embodiments, the adjustment mechanisms described herein may be controlled electro-mechanically. One or more motors may be electro-mechanically coupled to the linear actuator device, such as a lead screw, jack screw, ball screw, roller screw, etc. The rotary motion of the motors may be converted into linear motion through the linear actuator device to cause inward or outward movement of the virtual or augmented eyepieces. The motors may be a servo motor, stepper motor, or other types of electric motors. To control movement of the virtual or augmented eyepieces, the motors may be electrically coupled to an electronic controller. The electronic controller may include a microcontroller and a motor driver to control and drive the motors. Moreover, the microcontroller may comprise a microprocessor, memory, and a plurality of peripheral devices to form a system on a chip that may be applicable for a wide variety of applications.

In some embodiments, the adjustment mechanism may include one or more piezoelectric motors. The one or more piezoelectric motors may include piezoelectric linear actuators, which may be coupled to the virtual or augmented reality eyepieces to cause inward or outward movement of the virtual or augmented reality eyepieces. To control movement of the virtual or augmented reality eyepieces, the piezoelectric motors may be electrically coupled to an electronic controller. The electronic controller may include a microcontroller and a piezoelectric motor driver to control and drive the piezoelectric motor. Moreover, the microcontroller may comprise a microprocessor, memory, and a plurality of peripheral devices to form a system on a chip that may be applicable for a wide variety of applications.

Moreover, the various embodiments described above can be combined to provide further embodiments. U.S. patent application Ser. No. 61/891,801, filed Oct. 16, 2013, and U.S. patent application Ser. No. 14/516,180, filed Oct. 16, 2014, are each incorporated herein by reference in their entirety and aspects of the embodiments can be modified, if necessary, to employ concepts of the application to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A virtual or augmented reality headset, comprising:
a frame including opposing arm members and a bridge positioned intermediate the opposing arm members;
a pair of virtual or augmented reality eyepieces each having an optical center, the pair of virtual or augmented reality eyepieces movably coupled to the frame to enable adjustment of an interpupillary distance between the optical centers; and
an adjustment mechanism configured to simultaneously move the pair of virtual or augmented reality eyepieces to adjust the interpupillary distance between the optical centers of the virtual or augmented reality eyepieces along a first axis, the adjustment mechanism comprising:
a linear actuator having a link driving portion that is configured to translate linearly back and forth along a second axis perpendicular to the first axis, the link driving portion of the linear actuator being physically coupled to a first end of a first link and a first end of a second link to selectively move a connection point of the first end of the first link and a connection point of the first end of the second link together in a straight line in a same direction, a second end of the first link movably coupled to a first rail and a second end of the second link movably coupled to a second rail such that movement of the link driving portion of the linear actuator in a first linear direction along the second axis causes the first and second links and first and second rails to increase the interpupillary distance between the optical centers of the pair of virtual or augmented reality eyepieces and movement of the linear actuator in a second linear direction along the second axis that is opposite the first linear direction causes the plurality of links to decrease the interpupillary distance between the optical centers of the pair of virtual or augmented reality eyepieces.

2. The headset of claim 1 wherein the virtual or augmented reality eyepieces are movable between a narrowest configuration and a widest configuration, and wherein a difference between the interpupillary distance in the widest configuration and the interpupillary distance in the narrowest configuration is between about 20 mm and about 24 mm.

3. The headset of claim 1 wherein the adjustment mechanism is coupled to the bridge portion and the linear actuator includes a user manipulable control for selectively adjusting a position of each of the virtual or augmented reality eyepieces simultaneously.

4. The headset of claim 3, further comprising:
a selectively removable cover that is selectively positionable to alternatively prevent access to the user manipulable control and to provide access to the user manipulable control by the user.

5. The headset of claim 1 wherein the frame further includes a lock to selectively fix the virtual or augmented reality eyepieces in a selected position.

6. The headset of claim 1 wherein the bridge portion includes a nosepiece to engage a nose of a user and support the virtual or augmented reality eyepieces in front of the user's eyes.

7. The headset of claim 6 wherein the bridge portion further includes a base, and wherein the nosepiece is removably coupleable to the base to selectively lock the virtual or augmented reality eyepieces in a selected position.

8. The headset of claim 6 wherein the bridge portion further includes a base, and wherein the nosepiece is adjustably coupled to the base.

9. The headset of claim 1, further comprising:
a motor electro-mechanically coupled to the linear actuator; and
an electronic controller electrically coupled to the motor to control movement of the virtual or augmented reality eyepieces via the motor, the linear actuator and the first and second links.

10. The headset of claim 1 wherein each virtual or augmented reality eyepiece is arcuate and includes a medial end and a lateral end, the medial end positioned proximate the bridge of the frame and the lateral end positioned proximate a temple region of a respective one of the opposing arm members.

11. The headset of claim 10 wherein the frame includes a respective arcuate profile on each of opposing sides of the frame to at least partially nest with a respective one of the virtual or augmented reality eyepieces when the virtual or augmented reality eyepieces are in a narrowest configuration in which the interpupillary distance is at a minimum.

12. The headset of claim 1 wherein each respective eyepiece is supported in space only by a connection to the first and second linear rail of the frame positioned above the horizontal plane defined by the optical centers of the pair of virtual or augmented reality eyepieces.

13. The headset of claim 1, wherein the connection point of the first end of the first link and the connection point of the first end of the second link overlap each other.

14. The headset of claim 1, wherein the connection point of the first end of the first link and the connection point of the first end of the second link are the same point.

15. A virtual or augmented reality headset, comprising:
 a frame including opposing arm members and a bridge positioned intermediate the opposing arm members;
 a pair of virtual or augmented reality eyepieces each having an optical center, the pair of virtual or augmented reality eyepieces movably coupled to the frame to enable adjustment of an interpupillary distance between the optical centers; and
 an adjustment mechanism configured to simultaneously move the pair of virtual or augmented reality eyepieces to adjust the interpupillary distance between the optical centers of the virtual or augmented reality eyepieces along a first axis, the adjustment mechanism comprising:
 a linear actuator having a link driving portion that is configured to translate linearly back and forth along a second axis perpendicular to the first axis, the link driving portion of the linear actuator being physically coupled to a first end of a first link and a first end of a second link to selectively move a common connection point of the first end of the first link and the first end of the second link in a straight line, a second end of the first link movably coupled to a first rail and a second end of the second link movably coupled to a second rail such that movement of the link driving portion of the linear actuator in a first linear direction along the second axis causes the first and second links and first and second rails to increase the interpupillary distance between the optical centers of the pair of virtual or augmented reality eyepieces and movement of the linear actuator in a second linear direction along the second axis that is opposite the first linear direction causes the plurality of links to decrease the interpupillary distance between the optical centers of the pair of virtual or augmented reality eyepieces.

* * * * *